March 12, 1957   H. C. N. GOODHART   2,784,925
MEANS FOR AIDING THE LANDING OF AIRCRAFT
Filed Feb. 16, 1955   4 Sheets-Sheet 1

Inventor
Hilary C. N. Goodhart
By Ralph B. Stewart
Attorney

March 12, 1957  H. C. N. GOODHART  2,784,925
MEANS FOR AIDING THE LANDING OF AIRCRAFT
Filed Feb. 16, 1955  4 Sheets-Sheet 2

March 12, 1957 H. C. N. GOODHART 2,784,925
MEANS FOR AIDING THE LANDING OF AIRCRAFT
Filed Feb. 16, 1955 4 Sheets-Sheet 3

Inventor
Hilary C. N. Goodhart
By Ralph B. Stewart
Attorney

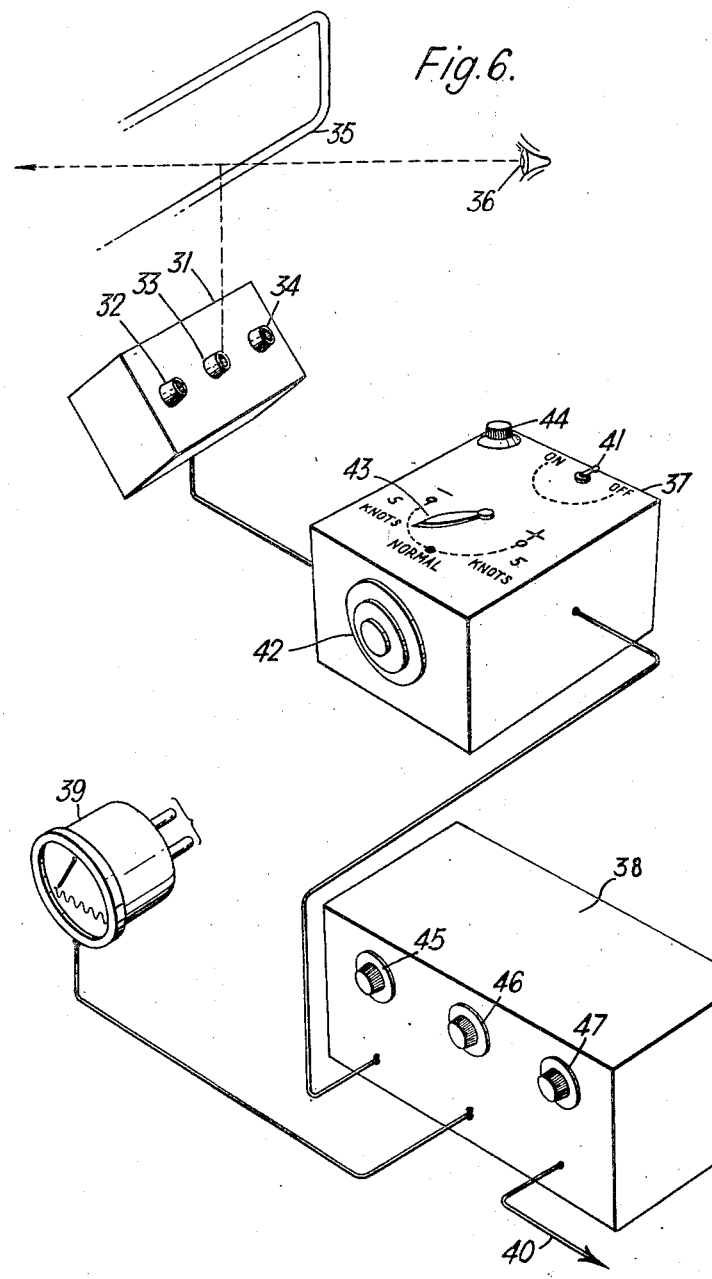

United States Patent Office 2,784,925
Patented Mar. 12, 1957

2,784,925

MEANS FOR AIDING THE LANDING OF AIRCRAFT

Hilary Charles Nicholas Goodhart, London, England, assignor to National Research Development Corporation, London, England, a British corporation Application February 16, 1955, Serial No. 488,697

Claims priority, application Great Britain February 25, 1954

6 Claims. (Cl. 244—114)

This invention relates to means for aiding the landing of aircraft, particularly on landing areas of restricted size such as the flight deck of an aircraft carrier (i. e. a ship adapted as an aircraft flight station or base).

With the advent of faster aircraft having necessarily high closing speeds at landing e. g. of the order of 100 knots, the problems associated with landing safely on aircraft carriers using known techniques have become acute. Of these problems, one is the inability of the Landing Signals Officer or "Batsman"—who signals, by means of small circular bats held in the hands, instructions to the pilot for landing—to perceive small, but important, errors in the pilot's approach; and for the pilot to make such consequential adjustments in the attitude of his aircraft, within the brief time available, as will enable him to effect a safe landing.

Some further idea of the problems in connection with landing on aircraft carriers will be gained by considering the typical case of a ship having a landing area on the flight deck 400 ft. long, and where the maximum pitch angle of the ship to the horizontal is assumed to be 1½°, the maximum vertical velocity of the ship in the touchdown area is 6 ft./sec., and the closing speed of the aircraft is 105 knots. The 6 ft./sec. vertical velocity of the touchdown area reduces the permissible maximum vertical component of the aircraft's velocity at landing to about 10 ft./sec., a small margin only for errors above this vertical component velocity being allowable. These conditions represent a mean angle of approach of only about 3° to the horizontal. A serious drawback of the known method of shipboard landing is that it requires a constant clearance (of, say, about 10 ft.) at the moment of passing over the round-down at the stern end of the flight deck. This means that the position of the touchdown point may be variable and may move dangerously far forward when the ship is in the bows-down attitude of pitch. The known method is troublesome also in that it involves pilot-initiated alterations in the approach path from the near horizontal to a 3° descent path at the most critical time of closing the ship, requiring considerable skill on the part of the pilot. Moreover, an alteration to only 4° in the case of 6 ft./sec. upward vertical ship movement might result in failure of the aircraft's undercarriage. These arguments lead to the conclusion that the most suitable landing approach is a steady sinking approach, made—once the pilot has turned into line with the flight deck—in a straight path at a constant glide angle of about 3° to the horizontal. The object of the present invention is to provide means for enabling an aircraft pilot to make such an approach, which involves no sudden manoeuvring action during any phase of the descent and requires, at the critical time of closing the ship, only that the pilot should maintain a steady course and pursue the steadily sinking path to a touchdown; and then close the throttle.

According to one feature of the invention, means for aiding an aircraft pilot to fly his aircraft along a defined descent path to a touchdown position on a landing area comprises a speculum or mirror adapted to be positioned inclinably at the landing area and to show to the pilot the image of a first fixed marker reflected in the mirror, the pilot's line of sight to the image being arranged to coincide with his light of sight to a directly visible second fixed marker at the landing area so as to define the angle of the desired path in elevation from the mirror, and the arrangement being such that the image and the second fixed marker are seen by the pilot to be displaced appreciably vertically from each other for a relatively small deviation in altitude of the aircraft from the defined descent path.

Preferably, the first at least of the two fixed markers should be a luminous marker, and the markers should contrast in colour one with the other and be arranged each in a horizontal line formation. For example, the first marker may be a horizontal row of lamps showing a yellow or amber colour, spaced some distance in front of the mirror (on which the lamps are trained), so that the image appears as a horizontal bar or "blob" of light across the face of the mirror; and the second marker may comprise a horizontal array of lamps showing a green or red colour towards the pilot and arranged adjacent the right and left hand sides of the mirror about the mid height thereof.

It is possible to use a plane mirror, in which case—with the first marker arranged in a horizontal straight line—the approach path will be in a fan-shaped inclined plane. The coverage of such a system in azimuth is however limited by the length of the light source. Preferably, the mirror is curved in horizontal section, though remaining straight in any vertical section, in order to give wide coverage in azimuth. The mirror may have a single reflecting surface of concave or convex cylindrical shape; or it may have a fluted surface, comprising in effect an assembly of concave or convex cylindrical mirrors arranged side by side.

When a curved mirror is used, the approach path no longer lies in an inclined plane, but in a space between two roughly conical surfaces. Ignoring the finite length of the light source, and the finite width of the mirror, it can be shown that the path will lie on the surface of a shallow, right circular cone leaving its vertex at the mirror and its axis parallel to the generating axis of the mirror. If the light from the first (luminous) marker travels upwards to the mirror centre at an angle $\phi$, and the mirror axis is inclined back at an angle $\theta$ to the vertical, the reflected image will be seen from dead astern at an angle $(\phi+2\theta)$ to the horizontal. When viewed from an angle $\psi$ to one side of the axis of the system, the image will be seen at an angle $\phi+\theta$ $(1+\cos \psi)$ to the vertical i. e. the slope of the line of sight to the image when viewed from one side is reduced by an amount $\theta$ $(1-\cos \psi)$ compared with the slope when viewed from dead astern. This phenomenon associated with a mirror sight is an advantage to the pilot. The normal landing approach to a carrier is along a curved path in azimuth, before turning into line with the flight deck. Consequently, the transition from the level flight condition for the down-wind and cross-wind legs is made gradual. If the path lies in an inclined plane, as opposed to a conical surface the same effect is produced to a more marked extent, and the pilot might even be required to climb on the cross-wind leg if a fairly tight turn were made.

The sensitivity of the system is gauged by the change in the vertical position of the reflected image in the mirror for a given change in the vertical position of the aircraft. The extreme errors which can be indicated are limited by the overall height of the mirror which should be so chosen that it allows a reasonable deviation above or below the ideal path yet does not allow excessive errors such as would put the aircraft in a dangerous position, unless a special warning device is employed.

The mirror may be adjustable in respect of its vertical distance above or below the landing area and in respect of its angle of inclination to suit the characteristics of different types of aircraft. In a shipborne installation, the mirror must be tiltable in elevation and its inclination with reference to the horizon be controllable by gyroscopic or like stabilizing means so as to compensate at least for pitching movements of the ship in a seaway. In an aircraft carrier fitted with a so-called "angled deck" i. e. one in which the runway is angled in relation to the centreline of the ship, it may be possible to site the mirror on or near the centreline of the ship where vertical movements of the mirror due to rolling will be negligible. In this position stabilization for roll as well as pitch can readily be achieved.

It will be clear that in making a landing, the pilot must have his visual attention concentrated almost entirely on the mirror, and he will therefore be unable to observe the behaviour of his aircraft in the normal way from his instrument panel. It is important however that he should continue to receive information particularly as to airspeed, and possibly as to other factors such as pitch attitude, angle of incidence or the like.

According to another feature of the invention, means for aiding a pilot to fly his aircraft along a defined descent path to a touchdown position on a landing area comprises, in combination with the foregoing, equipment in the aircraft for giving the pilot information about the behaviour of his aircraft e. g. as to airspeed, without distracting his forward visual attention from the landing area.

One form of equipment in the aircraft comprises a colour light unit operated by an airspeed operated detector to give the pilot information about his airspeed in the form of light signals, the unit being arranged so that the pilot sees said light signals reflected in his windscreen or other reflecting surface while he is looking ahead for landing. The light signals reflected from the windscreen or other reflecting surface may be of such wavelength and directed at such an angle toward the pilot as to be viewed by him extra-foveally.

One embodiment of the invention will now be described, as applied to an aircraft carrier, and with reference to the accompanying drawings wherein:

Figure 1 is a perspective view of an aircraft carrier in which equipment according to the present invention has been fitted, and showing an aircraft landing thereon.

Figure 2 comprises three diagrammatic representations A, B and C of the front elevation of a mirror and a row of second marker lights, showing the reflected image of a row of first marker lights. Portion A shows the relative position of the image as it appears to the pilot when he is on the correct path; portion B as it appears when he is approaching too low; and portion C as it appears when he is approaching too high.

Figure 6 is a diagrammatic view of equipment for giving the pilot a continuous visual indication of his airspeed without distracting his forward visual attention from the landing area.

Figure 1:
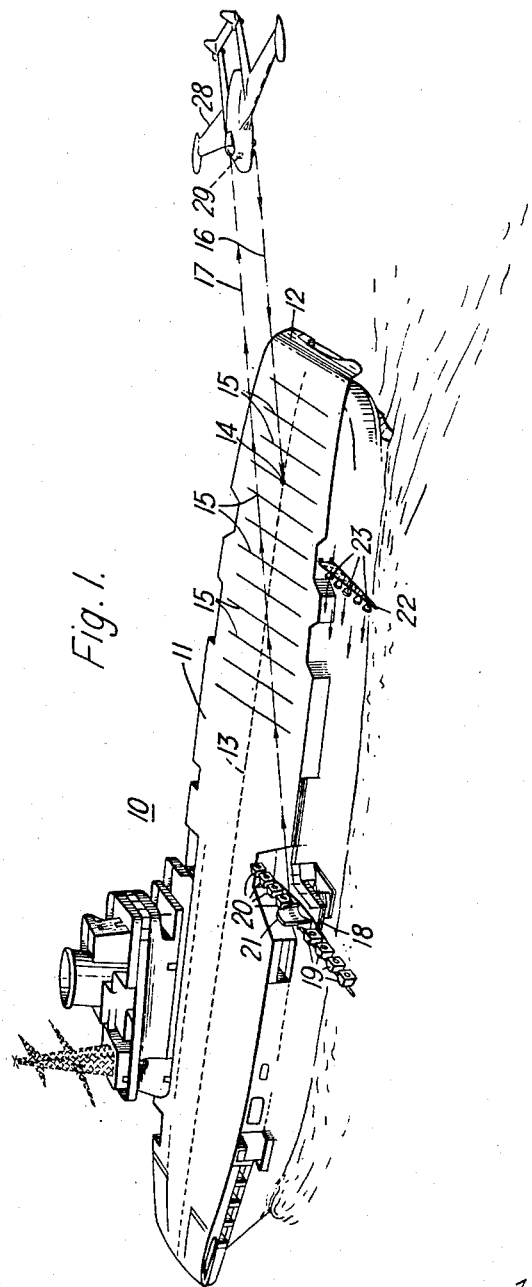
Figure 2:
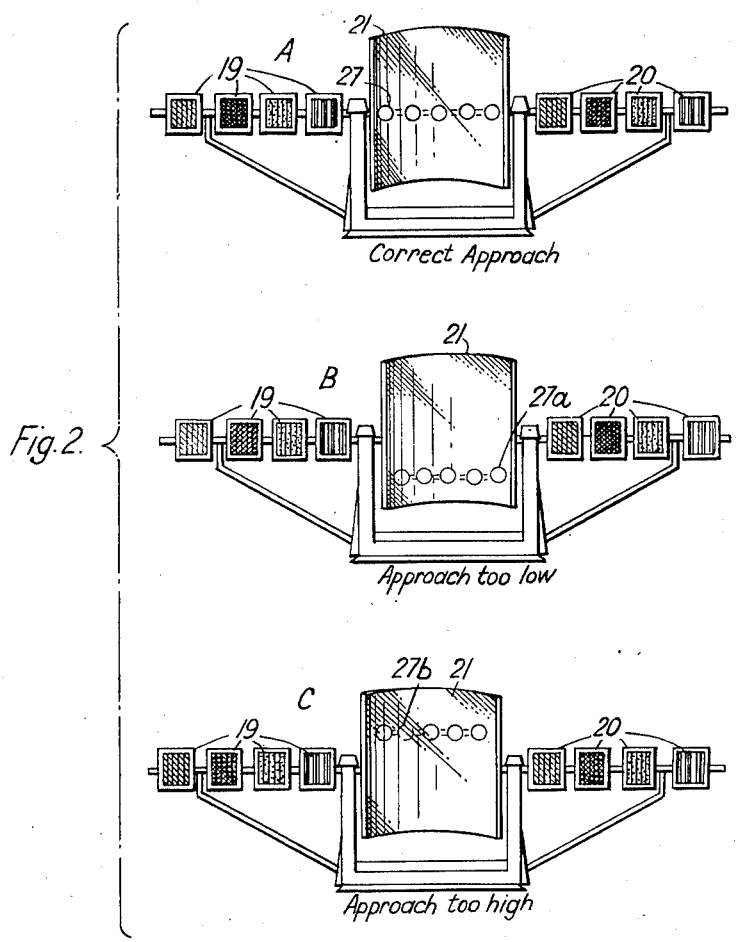
Figure 3:
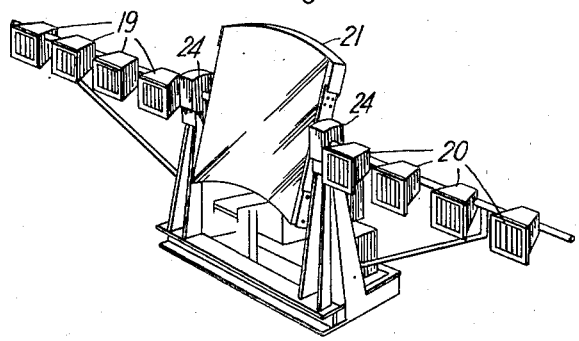
Figure 3 is a perspective view showing the front of the mirror and its associated second marker lights.
Figure 4:
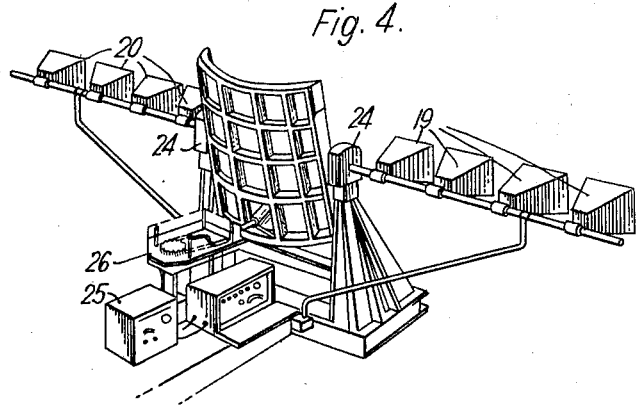
Figure 4 is a perspective view of the mirror, second marker lights, and a control gear, viewed from the rear.
Figure 5:
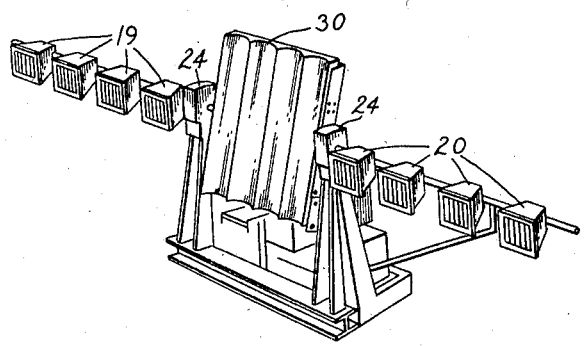
Figure 5 is a view corresponding to Figure 3 but showing, in this case, a fluted mirror.

Referring to Figure 1, this illustrates, in general perspective view, an aircraft carrier 10 having a flight deck 11 terminating at the stern in a round-down 12; on the deck is marked the usual centreline 13, while the point indicated by reference numeral 14 is that at which the aircraft wheels should first touch the deck in a satisfactory landing. Arrestor wires generally indicated by lines 15 are arranged athwartship to include an area around the point at which an arrestor hook on the aircraft should touch down, allowing a small margin for error. From point 14 the dotted line 16 indicates the path which should be followed by the wheels of an aircraft 28 when making a satisfactory landing, whilst the dotted line 17 indicates the line followed by the pilot's eye when, as he makes his final approach from dead astern, he watches a mirror 21 on the carrier. A first fixed marker 22 arranged some distance in front of the mirror comprises a horizontal array of lamps 23 shielded from the pilot and trained toward the mirror, their reflected image 27 (shown in Figure 2) being observable by the pilot of the aircraft 28 over a wide angle in azimuth before he turns into line with the carrier. The pilot observes the apparent vertical position of the image in juxtaposition with a horizontal array of fixed green lights 19 and 20 arranged adjacent the right and left hand sides of the mirror at about the mid height thereof. The mirror 21 is tiltable about a horizontal axis (being mounted on trunnions 24 shown in Figures 3 and 4) under the control of a gyro unit 25 through appropriate drive means 26 (Figure 4). The control is arranged to tilt the mirror continuously through half the instantaneous pitch angle of the ship, so that the system is stabilized with reference to the horizon despite pitching movements in a seaway. The reflecting surface of the mirror is desirably furnished in a non-tarnishing specular metal, e. g. that known under the trade name "Brytal." Although for carrier use a concave mirror is desirable, it is possible to use a convex mirror; or a series of concave or convex mirrors mounted together in a straight line formation so as to present a fluted surface such as that of mirror 21 shown in Figure 5, which comprises a series of four concave mirrors 30 mounted side by side. In the arrangement in Figures 1 and 3, mirror 21 may conveniently be approximately 5 ft. in height and 4 ft. in width with a radius of curvature of 10 ft. Its distance from the light source 22 may be between 150 and 200 ft., the light source itself being about 150 ft. from the round-down 12. The lamps 23 composing the light source 22 may extend over a lateral distance of about 20 ft. With this arrangement the reflected image 27 in mirror 21 is normally visible from 40° to port to 30° to starboard of the stern of the carrier and the desired descent path is normally at an angle of 3° to 4° to the horizontal. As already stated, the fixed lights 19, 20, are desirably green in colour, and it is found, in practice, desirable that the light source 22 should be given a colour, e. g. yellow, contrasting both with the fixed lights and with normal natural lights at sea.

The pilot of an aircraft travelling towards the carrier along the glide path 17 will, during operation of the apparatus described above, see a horizontal bar of green lights broken at its centre by a "blob" of yellow light. This is indicated diagrammatically in Figure 2A where the position of the yellow light image is indicated by reference numeral 27, though, in practice, the actual appearance of the light at 27 can be more aptly described as a "blob." If during his descent towards the carrier the pilot allows his aircraft to drop below the optimum path, the blob of light 27 will move to the position shown at 27a in Figure 2B, whilst if the pilot's approach is too high he will see the effect shown in Figure 2C where the blob will have risen, e. g. to the position 27b. Pilots normally experience no difficulty in spotting, and aligning their aircraft with, the centre line on the carrier deck. With the system described, once the image in mirror 21 is visible to the pilot, he will be able, even when some considerable distance (e. g. from a quarter of a mile to a mile) away from the carrier, to correct his attitude of descent and to maintain a smooth and accurate descent path to the touch-down.

A concurrent factor of primary importance to the pilot will be his airspeed, and of importance also will be pitch attitude and angle of incidence. Audio or visual equipment 29 may be fitted in the aircraft for giving the pilot information as to one or more of these factors without requiring him to take his eyes off the mirror at the landing area.

One form of visual airspeed indicator which has been found to give reasonably satisfactory results is illustrated in Figure 6. The operating basis of this apparatus is that of a coded indication from three coloured lights, which the pilot sees reflected in his front windscreen, roughly on his line of sight to the landing area. The apparatus comprises a lights unit 31 consisting of three small electric lamps 32, 33 and 34 of between 3 and 30 watts output, coloured red, green and amber respectively and mounted in a short horizontal row below the front windscreen 35 so as to be reflected into the pilot's eye 36. A pilot's control unit 37 fitted in the cockpit is electrically connected to the lights unit 31 and to a relay/oscillator unit 38, the oscillator unit being in turn connected to an airspeed detector unit 39 and having a power supply 40. The airspeed detector unit 39 operates off the normal Pitot-static sources in the aircraft and provides a variable voltage output via a potentiometer, which output is translated by the oscillator unit 38 into coded signals for the lights unit. The pilot's control unit 37 enables the pilot to switch the apparatus on or off, to dim the lights for night flying, to change a datum reference speed, and to test the functioning of the relay unit.

The three coloured lights are used to indicate to the pilot whether his speed is approximately correct, a little too high or low, or much too high or low. For example, assuming 100 knots as the ideal speed, the following sequence of light signals is seen by the pilot as his speed decreases:

| Speed | Indication |
|---|---|
| Down to 107 knots | Amber light flashing 3 c. p. s. |
| 107 to 102 knots | Alternate Amber/Green, 1 c. p. s. |
| 102 to 98 knots | Green light flashing 1 c. p. s. |
| 98 to 93 knots | Alternate Red/Green, 1 c. p. s. |
| Below 93 knots | Red light flashing 3 c. p. s. |

Adjustable controls in the relay/oscillator unit 38, pre-set on the ground, comprise (i) a datum shift control 45 which raises or lowers the datum speed i. e. the centre of the green zone, carrying the four change-over speeds (at 107, 102, 98 and 93 knots in the above example) with it, i. e. without altering the widths of the zones; (ii) a green zone width control 46 which widens or narrows the speed band within which the green light alone is visible, at the expense of the two-colour zones outside it; and (iii) a two-colour zone width control 47 which widens or narrows the width of the speed bands representing small errors, in which either the Amber/Green or Red/Green indication is seen. In addition, the pilot can make a limited amount of independent adjustment of the datum speed by means of a three-position selector switch 43 on the control unit 37. This will raise or lower the datum speed by, say 5 knots above or below the "normal" speed set by the datum shift control in the oscillator/relay unit.

Tests have shown that this form of indication of airspeed error, with reference to a pre-selected datum speed for landing, largely relieves the pilot of the necessity to look inside the cockpit at this critical stage of the landing. The code described is readily understood and is not liable to misinterpretation. The flashing lights provide the pilot with a continuous check on his airspeed, even though these lights are not focussed at infinity.

What I claim is:

1. A signal system for aiding an aircraft pilot to fly his aircraft along a defined descent path to a touchdown position on a landing area comprising, in combination, a mirror positioned at the rear of said landing area and facing the approach side thereof, a first fixed marker spaced from said mirror on the front side thereof, said mirror being so positioned relative to said fixed marker and said descent path as to present to the pilot at various points along said path an image of said fixed marker at a fixed location in said mirror, and a second fixed marker directly visible to the pilot and arranged in horizontal alignment with said fixed image location, whereby said image and said second fixed marker are displayed to the pilot as being displaced vertically from each other for any deviation in altitude of the aircraft from the defined descent path.

2. A signal system according to claim 1, wherein said first and second markers are arranged in horizontal line formation, and are luminous markers of contrasting color.

3. A signal system according to claim 1, wherein the reflecting surface of said mirror is curved to display therein an image of said first marker over a wide angle in azimuth in front of said mirror.

4. A signal system according to claim 1, wherein said landing area comprises the flight deck of a ship and including means mounting said mirror for tilting movement in elevation, and gyroscopic stabilizing means controlling the tilting of said mirror to compensate for movement of the ship in a seaway.

5. A signal system according to claim 4, wherein said stabilizing means tilts said mirror continuously through half the instantaneous pitch angle of the ship.

6. A signal system according to claim 1, wherein the reflecting surface of said mirror is curved to display therein an image of said first marker over a wide angle in azimuth in front of said mirror, and wherein said landing area comprises the flight deck of a ship and including means mounting said mirror for tilting movement in elevation, and gyroscopic stabilizing means controlling the tilting of said mirror to compensate for movement of the ship in a seaway.

References Cited in the file of this patent

UNITED STATES PATENTS

| | | |
|---|---|---|
| 1,412,997 | Bonneau | Apr. 18, 1922 |
| 1,871,877 | Buckman | Aug. 16, 1922 |
| 2,336,809 | Slavens | Dec. 14, 1943 |
| 2,400,232 | Hall | May 14, 1946 |
| 2,641,160 | Mihalakis | June 9, 1953 |